US009184627B2

(12) United States Patent
Huang et al.

(10) Patent No.: US 9,184,627 B2
(45) Date of Patent: Nov. 10, 2015

(54) CHARGING SYSTEM FOR ELECTRONIC DEVICE

(71) Applicant: INTEL CORPORATION, Santa Clara, CA (US)

(72) Inventors: Lilly Huang, Portland, OR (US); Wayne L. Proefrock, Hillsboro, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 13/730,561

(22) Filed: Dec. 28, 2012

(65) Prior Publication Data
US 2014/0184137 A1    Jul. 3, 2014

(51) Int. Cl.
*H02J 7/00* (2006.01)
*H02J 7/35* (2006.01)
*H02J 3/38* (2006.01)
*H02J 7/04* (2006.01)

(52) U.S. Cl.
CPC . *H02J 7/35* (2013.01); *H02J 3/385* (2013.01); *H02J 7/0068* (2013.01); *H02J 7/045* (2013.01)

(58) Field of Classification Search
CPC ........... H02J 7/35; H02J 7/0068; H02J 7/045; H02J 3/385
USPC .................. 320/101, 110, 114, 122
See application file for complete search history.

(56) References Cited

U.S. PATENT DOCUMENTS

| | | | |
|---|---|---|---|
| 5,548,200 A * | 8/1996 | Nor et al. ....................... | 320/109 |
| 5,640,076 A | 6/1997 | Youn ................................ | 320/2 |
| 6,222,370 B1 | 4/2001 | Schousek et al. | |
| 6,271,643 B1 * | 8/2001 | Becker et al. ................. | 320/112 |
| 6,392,384 B1 | 5/2002 | Hwang Bo et al. | |
| 6,448,742 B1 | 9/2002 | Waterman et al. | |
| 7,023,180 B2 | 4/2006 | Nagai et al. .................... | 320/162 |
| 7,030,517 B2 | 4/2006 | Hansmann et al. ........... | 307/150 |
| 7,425,815 B2 | 9/2008 | Wong et al. .................... | 320/141 |
| 7,432,685 B2 | 10/2008 | Hayashi ......................... | 320/128 |
| 7,446,434 B1 | 11/2008 | Simmons et al. | |
| 7,498,769 B1 * | 3/2009 | Potanin et al. ................. | 320/125 |
| 7,514,900 B2 | 4/2009 | Sander et al. .................. | 320/101 |
| 7,535,122 B2 * | 5/2009 | Visairo-Cruz et al. .......... | 307/80 |
| 7,560,829 B2 | 7/2009 | Proefrock et al. .............. | 307/18 |
| 7,573,235 B2 * | 8/2009 | Hand ............................. | 320/122 |

(Continued)

FOREIGN PATENT DOCUMENTS

| | | |
|---|---|---|
| JP | 2002-084756 | 3/2002 |
| JP | 2005-117768 | 4/2005 |

(Continued)

OTHER PUBLICATIONS

U.S. Office Action issued in co-pending U.S. Appl. No. 13/538,265 dated Sep. 22, 2014.

(Continued)

*Primary Examiner* — Helen Rossoshek
(74) *Attorney, Agent, or Firm* — KED & Associates LLP

(57) ABSTRACT

A charging system may include a switching device to receive an output voltage from an alternative power source and to provide an output voltage of the charging system, and an algorithm device to provide a control signal to the switching device based on a sensed power from the power source and a sensed output voltage from the charging system.

16 Claims, 4 Drawing Sheets

(56) References Cited

U.S. PATENT DOCUMENTS

| | | | |
|---|---|---|---|
| 7,615,965 B2 | 11/2009 | Popescu-Stanesti et al. | 320/128 |
| 7,622,898 B2 | 11/2009 | Shimizu et al. | 320/166 |
| 7,759,906 B2 | 7/2010 | Ferguson | 320/164 |
| 7,790,307 B2 | 9/2010 | Kim | 429/122 |
| 7,870,916 B2 * | 1/2011 | Carter | 180/65.24 |
| 7,893,657 B2 | 2/2011 | Chavakula | 320/138 |
| 8,120,312 B2 * | 2/2012 | Bucur et al. | 320/106 |
| 8,174,313 B2 * | 5/2012 | Vice | 330/127 |
| 8,242,742 B2 | 8/2012 | Kao et al. | |
| 8,339,105 B2 | 12/2012 | Maleyran et al. | 320/138 |
| 8,368,345 B2 | 2/2013 | Wahlqist et al. | 320/101 |
| 8,400,162 B1 | 3/2013 | Jannson et al. | |
| 8,450,980 B2 | 5/2013 | Kumar et al. | 320/138 |
| 8,482,260 B2 | 7/2013 | Hsieh et al. | 320/138 |
| 8,581,550 B2 | 11/2013 | Lin et al. | 320/123 |
| 8,587,251 B2 | 11/2013 | Nakashima et al. | 320/101 |
| 8,773,077 B1 * | 7/2014 | Elmes et al. | 320/145 |
| 8,903,456 B2 * | 12/2014 | Chu et al. | 455/567 |
| 2001/0034807 A1 | 10/2001 | Takaoka et al. | |
| 2003/0057920 A1 * | 3/2003 | Dotzler | 320/162 |
| 2005/0141154 A1 * | 6/2005 | Consadori et al. | 361/62 |
| 2009/0128086 A1 * | 5/2009 | Lee | 320/101 |
| 2009/0212222 A1 | 8/2009 | Kito et al. | 250/361 R |
| 2011/0029703 A1 | 2/2011 | Huo et al. | |
| 2011/0062913 A1 | 3/2011 | Lin et al. | 320/101 |
| 2011/0109261 A1 | 5/2011 | Chavakula | 320/101 |
| 2011/0133700 A1 * | 6/2011 | Martin et al. | 320/145 |
| 2012/0091968 A1 | 4/2012 | Heo et al. | 320/138 |
| 2012/0098350 A1 | 4/2012 | Campanella et al. | |
| 2012/0176078 A1 * | 7/2012 | English et al. | 320/101 |
| 2012/0187897 A1 * | 7/2012 | Lenk et al. | 320/101 |
| 2012/0280648 A1 | 11/2012 | Hwang et al. | 320/108 |
| 2014/0001849 A1 * | 1/2014 | Huang et al. | 307/24 |
| 2014/0056041 A1 * | 2/2014 | Zhu et al. | 363/56.01 |
| 2014/0062395 A1 * | 3/2014 | Kwon et al. | 320/108 |
| 2014/0184160 A1 * | 7/2014 | Huang et al. | 320/114 |

FOREIGN PATENT DOCUMENTS

| | | |
|---|---|---|
| JP | 2005-215983 | 8/2005 |
| KR | 10-2007-0109569 | 11/2007 |
| KR | 10-1170079 | 7/2012 |

OTHER PUBLICATIONS

U.S. Office Action issued in co-pending U.S. Appl. No. 13/728,227 dated Dec. 18, 2014.
U.S. Appl. No. 13/538,265, filed Jun. 29, 2012, Huang et al.
U.S. Appl. No. 13/728,227, filed Dec. 27, 2012, Huang et al.
U.S. Appl. No. 13/728,628, filed Dec. 27, 2012, Proefrock et al.
International Search Report and Written Opinion for PCT/US2013/061723 dated Jan. 21, 2014.
U.S. Office Action for U.S. Appl. No. 13/538,265 dated Mar. 5, 2015.
U.S. Office Action for U.S. Appl. No. 13/728,268 dated Jun. 29, 2015.
U.S. Office Action for U.S. Appl. No. 13/728,227 dated Jul. 8, 2015.

* cited by examiner

CHARGING SYSTEM FOR ELECTRONIC DEVICE

BACKGROUND

1. Field

Embodiments may relate to a charging system for alternative energy sources (or alternative power sources).

2. Background

There may be a desire to boost performance and utility of mobile devices (or electronic devices) by extending their battery life. A charging system may be used to provide power to the mobile device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

An electronic device (or mobile device) may utilize an alternative power source (or a harvested energy) in order to power the electronic device. However, the alternative power source (or harvested energy) may be an unstable voltage supply. That is, an output voltage from a harvester (or other device) may vary widely. For example, the output voltage of a solar panel may range from a zero voltage to a large open circuit voltage.

A voltage supply with such a wide voltage variation may not be directly applied to a mobile device (or any other electronic device) since the device may be designed to operate based on a stable (or regulated) voltage supply. In order to maintain a constant voltage supply, a voltage regulator (VR) may be utilized. For example, a direct current/direct current (DC/DC) voltage regulator may be provided in a power delivery path in order to stabilize the output voltage. However, the DC/DC regulator inserted in the power delivery path may be at a high cost and result in power loss or low efficiency in power delivery.

Figure 1:
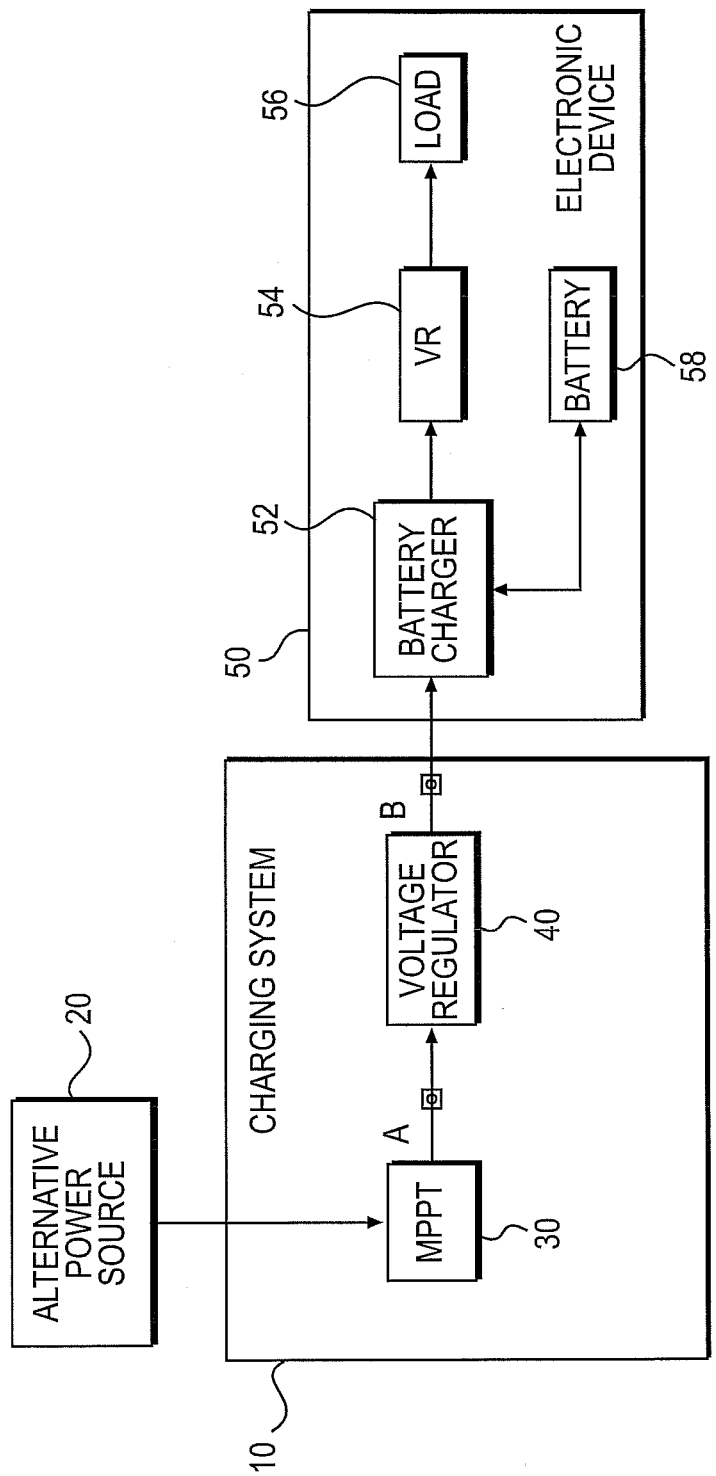
FIG. 1 is a diagram of a charging system and an electronic device according to an example arrangement.

FIG. 1 shows a charging system and an electronic device according to an example arrangement. Other arrangements may also be provided.

More specifically, FIG. 1 shows a charging system 10 that includes components to charge an electronic device 50 by using an alternative power source 20 (or alternative energy source). The charging system 10 is shown in FIG. 1 as being external to the electronic device 50. However, the charging system 10 may be part of the electronic device 50.

The electronic device 50 may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc.

The alternative power source 20 may be any one of a solar energy source, a mechanical energy source (such as via wind), a photovoltaic energy source, a thermal energy source, a radio frequency (RF) energy source, a vibration energy source, a biomechanical energy source, a fuel cell and/or any other power source.

The alternative power source 20 may provide power (or energy) to the charging system 10. As one example, the alternative power source 20 may provide an input power (or input energy) to a Maximum Power Point Tracking (MPPT) device 30. The MPPT device 30 may be a device to dynamically tune an output impedance of the connected power source (or energy source) so that output power of the power source is optimal and/or a maximum available power (from a harvester) is outputted and delivered to a load.

The MPPT device 30 may provide a power supply (or an output voltage) to a voltage regulator 40 based at least in part on the power provided by the alternative power source 20. The voltage regulator 40 may provide a regulator output voltage to the electronic device 50 based at least in part on the requirement of input voltage of a connected battery charger 52. Node A may be a node corresponding to the output voltage of the MPPT device 30 and/or corresponding to an input voltage to the voltage regulator 40. Node B may be a node corresponding to the output voltage of the voltage regulator 40 and/or corresponding to an input voltage of the electronic device 50.

The electronic device 50 may include the battery charger 52 to receive an input voltage (or power) from the voltage regulator 40. The battery charger 52 may provide an output voltage to a voltage regulator 54. The voltage regulator 54 (of the electronic device 50) may provide an output voltage to a load 56. The voltage regulator 54 may provide a regulated output voltage for the load 56. As one example, the load 56 may be a display device.

The battery charger 52 may also (or alternatively) provide an output voltage to a battery 58 (provided at the electronic device 50). The battery 58 may be charged by the voltage received from the battery charger 52. The battery charger 52 may provide an output voltage to either the load 56 (via a voltage regulator 54) or the battery 58.

FIG. 1 shows the use of an alternative power source (or alternative energy source). As stated above, power received and the supply output voltage from an alternative power source may not be stable or proper. As one example, the output voltage (at node A) of the MPPT device 30 may be less than 4.0 volts. However, without a voltage regulator, the input voltage (at node B) of the battery charger 52 may be required to be within a voltage of 4.5 volts to 6.2 volts in order to operate properly. Therefore and as shown in FIG. 1, the voltage regulator 40 may be inserted between the MPPT device 30 and the battery charger 52. The voltage regulator 40 may provide a proper and regulated output voltage to the electronic device 50. However, it may be undesirable to insert the voltage regulator 40 due to the induced power losses and the cost and associated real estate, especially in view of applications of an alternative power source.

Figure 2:
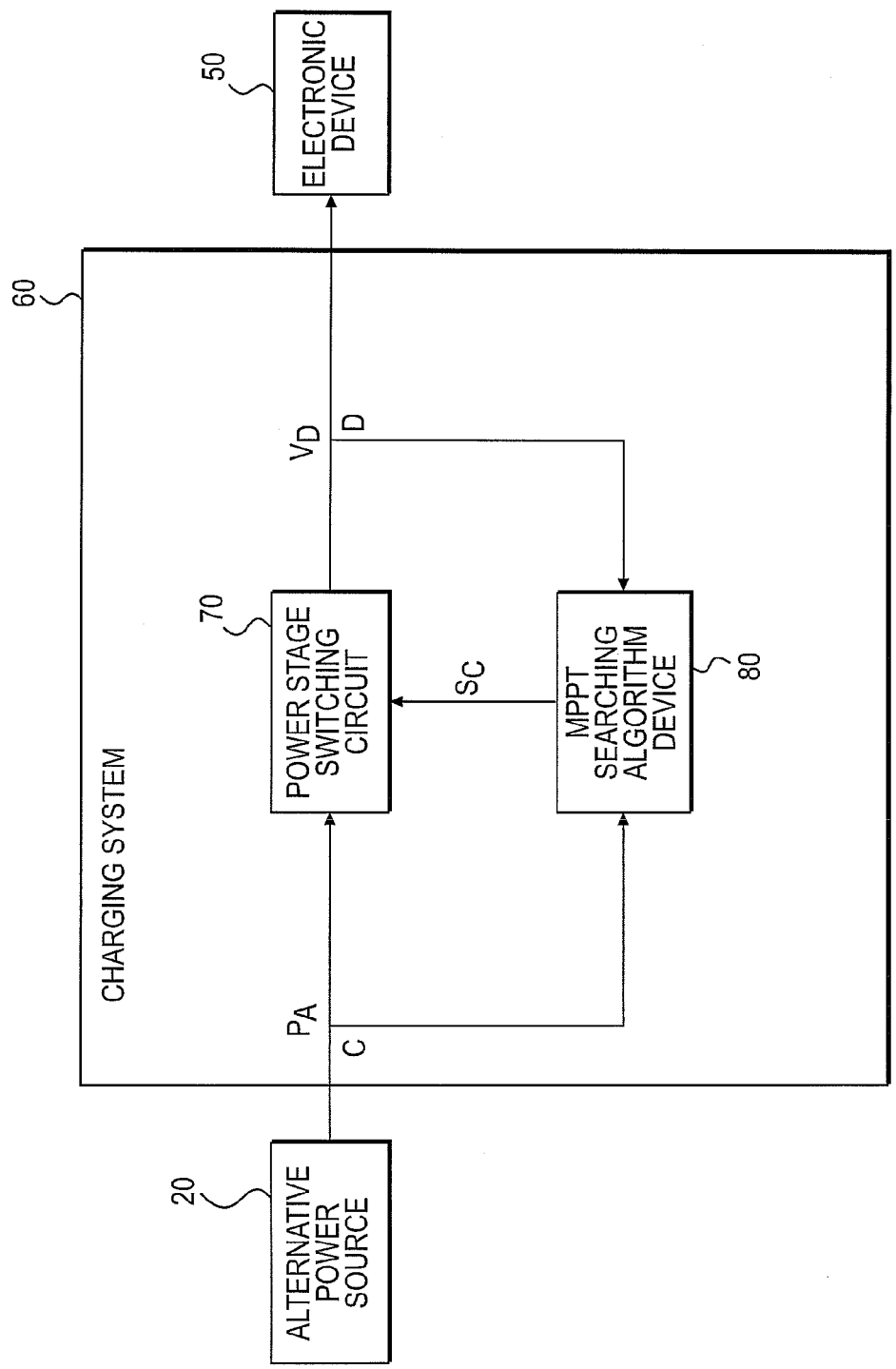
FIG. 2 is a diagram of a charging system and an electronic device according to an example embodiment.

FIG. 2 is a diagram of a charging system and an electronic device according to an example embodiment. Other embodiments and configurations are also within the scope of the present invention.

More specifically, FIG. 2 shows a charging system 60 that includes components to charge the electronic device 50 (such as a mobile terminal) by using the alternative power source 20. The charging system 60 is shown in FIG. 2 as being external to the electronic device 50. However, the charging system 60 may be part of the electronic device 50.

As shown in FIG. 2, the charging system 60 may avoid providing the voltage regulator 40 between the alternative power source 20 and the electronic device 50, such as shown in FIG. 1.

The charging system 60 may include a power stage switching circuit 70 (or a switching circuit) and a MPPT searching algorithm device 80 (or an algorithm device). The power stage switching circuit 70 may also be called a switching device.

The charging system 60 may provide power to the electronic device 50 based on power (or energy) received from the alternative power source 20.

The charging system 60 (FIG. 2) may utilize or leverage inherent characteristics of a power harvester and MPPT circuitry, and may apply intelligence of a control algorithm to simultaneously achieve both maximum power tracking and voltage control. This may enable system performance without requiring an extra voltage regulator within the charging system 60, thereby increasing an overall power transfer efficiency and lowering the cost.

In FIG. 2, Node C may be a node corresponding to an output voltage of the alternative power source 20 (and/or an input voltage to the charging system 60). Node D may be a node corresponding to an input voltage of the electronic device 50 (and/or an output voltage from the charging system 60).

The power stage switching circuit 70 may be provided between Node C and Node D. The MPPT searching algorithm device 80 may also be provided between Node C and Node D.

The power stage switching circuit 70 may be a buck-boost DC/DC voltage conversion device that increases or decreases an input voltage (at Node C) to provide a stable output voltage (at Node D). The power stage switching circuit 70 may provide a power path from the alternative power source 20 to the electronic device 50. The power stage switching circuit 70 may include power switches, driving circuits, and/or power components (such as inductors or capacitors). Operation of the power stage switching circuit 70 may be controlled by the MPPT searching algorithm device 80. An embodiment of the power stage switching circuit 70 may be described below with respect to FIG. 3.

The MPPT searching algorithm device 80 may include a microcontroller (or controller) that executes a program (such as an algorithm) to control the power stage switching circuit 70. An embodiment of the algorithm may be described below with respect to FIG. 4.

Based at least in part on execution of the algorithm, the MPPT searching algorithm device 80 may provide a control signal $S_C$ to the power stage switching circuit 70. The control signal $S_C$ may control operations of the power stage switching circuit 70. The control signal $S_C$ may increase or decrease the output voltage (at Node D).

A sensed output power $P_A$ of the alternative power source 20 (at Node C) may be provided to (or determined at) the MPPT searching algorithm device 80. A sensed output voltage $V_D$ of the power stage switching circuit 70 (at Node D) may be provided to (or determined at) the MPPT searching algorithm device 80.

The output power $P_A$ (at Node C) may be sensed by a device external to the MPPT searching algorithm device 80. Alternatively, the output power $P_A$ (at Node C) may be sensed by a device internal to the MPPT searching algorithm device 80.

The output voltage $V_D$ (at Node D) may be sensed by a device external to the MPPT searching algorithm device 80. Alternatively, the output voltage $V_D$ (at Node D) may be sensed by a device internal to the MPPT searching algorithm device 80.

The MPPT searching algorithm device 80 may receive (or determine) the sensed output power $P_A$ and the sensed output voltage $V_D$, and the MPPT searching algorithm device 80 may provide the control signal $S_C$ (or a switching signal) to the power stage switching circuit 70 based at least in part on the algorithm executed by the microcontroller.

The power stage switching circuit 70 may adjust the output voltage of the power stage switching circuit 70 (at Node D) based on the received control signal Sc. The control signal $S_C$ may be a periodic pulsing signal with a controlled duty signal that is determined based on the MPPT searching algorithm device 80. The MPPT searching algorithm device 80 may perform a maximum power tracking function (by tuning output impedance of the power source). The MPPT searching algorithm device 80 may constantly monitor the resulting voltage of the sensed voltage $V_D$ at the Node D (FIG. 2). If it achieves the MPPT point while the sensed voltage $V_D$ falls in the specified range (ex. $V_D$ min<$V_D$<$V_D$ max), then the impedance tuning may stop. However, if the sensed output voltage $V_D$ goes out of the "window" or the voltage range required before it reaches the MPPT point, the algorithm may terminate the impedance tuning and stay within the output voltage $V_D$ range even when the output power is not optimal under such a scenario.

Figure 3:
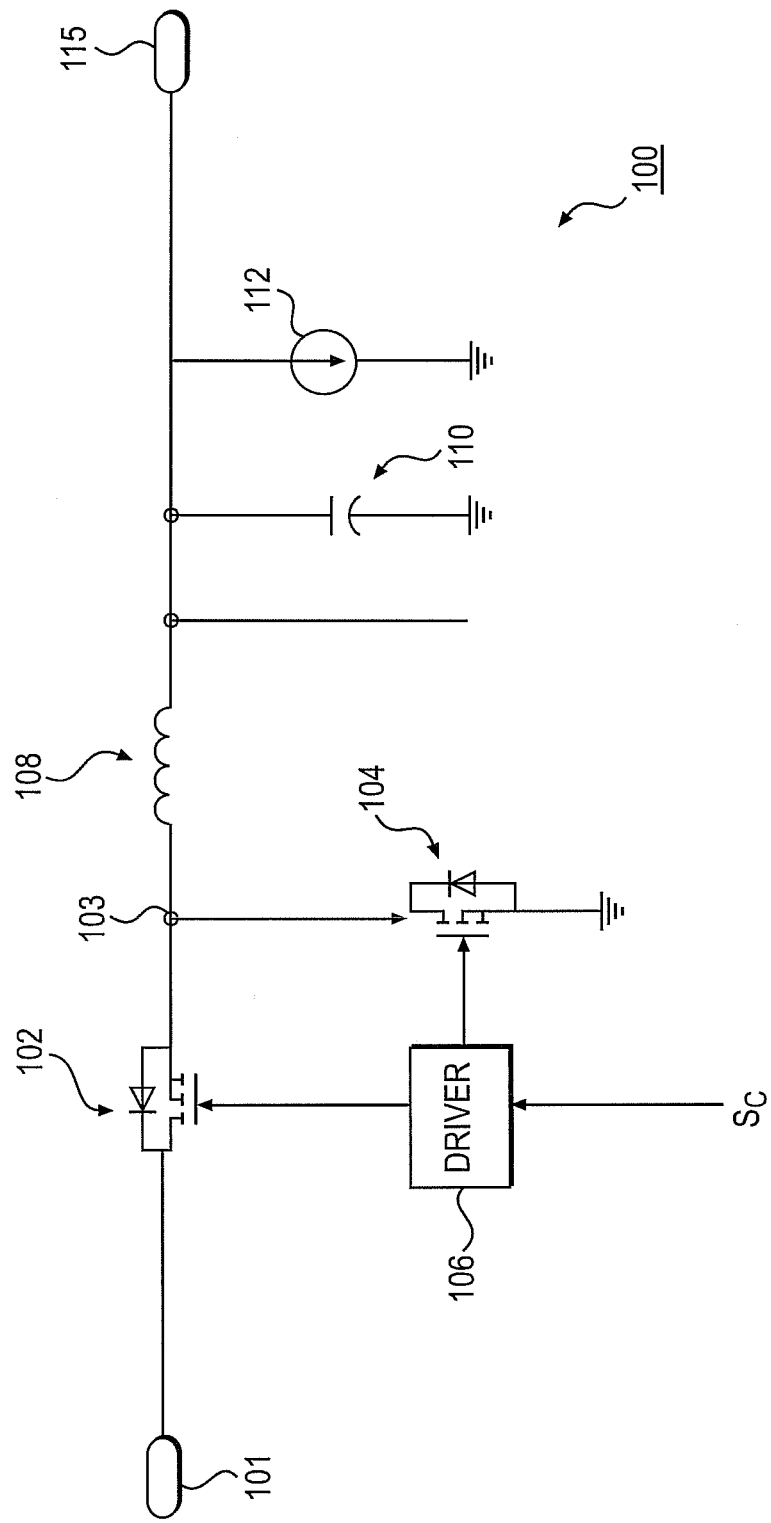
FIG. 3 is a circuit diagram of a power stage switching circuit according to an example embodiment.

FIG. 3 is a circuit diagram of a power stage switching circuit according to an example embodiment. Other embodiments, components, and circuit diagrams are also within the scope of the present invention.

FIG. 3 shows a switching circuit 100 that may correspond to the power stage switching circuit 70 (of the charging system 60).

The circuit 100 may have an input node 101 (or input pin) and an output node 115 (or output pin). The input node 101 may correspond to Node C, and the output node 115 may correspond to Node D.

The input node 101 may receive the input power from the alternative power source 20. The received input power may correspond to the $P_A$.

The output node 115 may provide the output power and supply voltage to the electronic device 50. The output voltage may correspond to the sensed output voltage $V_D$.

FIG. 3 shows that the switching circuit 100 may include a first transistor 102, a second transistor 104, a driver 106, an inductor 108, a capacitor 110 and a load such as a current source 112, for example. The first transistor 102 and the second transistor 104 may each be a metal-oxide-semiconductor field effect transistor (power MOSFET), for example.

The first transistor 102 and the inductor 108 may be coupled in series between the input node 101 and the output node 115. The second transistor 104 may be coupled between a node 103 (between the first transistor 102 and the inductor 108) and ground. The capacitor 110 may be coupled between the output node 115 and ground. The current source 112 may be provided between the output node 115 and ground.

The driver 106 may receive the control signal $S_C$ and provide an output to either the first transistor 102 or the second transistor 104. More specifically, the driver 106 may receive the control signal $S_C$ from the MPPT searching algorithm device 80. The control signal $S_C$ received at the driver 106 may control the first transistor 102 and/or the second transistor 104 such that various operations may occur.

The driver 106 may provide a signal to a gate of the first transistor 102. The driver 106 may also (or alternately) provide a signal to the second transistor 104.

As one example, based on the sensed power $P_A$ (at Node C) and the sensed voltage $V_D$ (at Node D), the control signal $S_C$ may be provided (from the MPPT searching algorithm device 80 to the power stage switching circuit 70) to change the output voltage (at Node D) of the charging system 60. This may change the input voltage to the electronic device 50. As one example, the output voltage (at Node D) of the charging system 60 may increase or decrease based on the control signal $S_C$. The switching circuit 100 may adjust impedance of the output voltage from the charging system.

Figure 4:
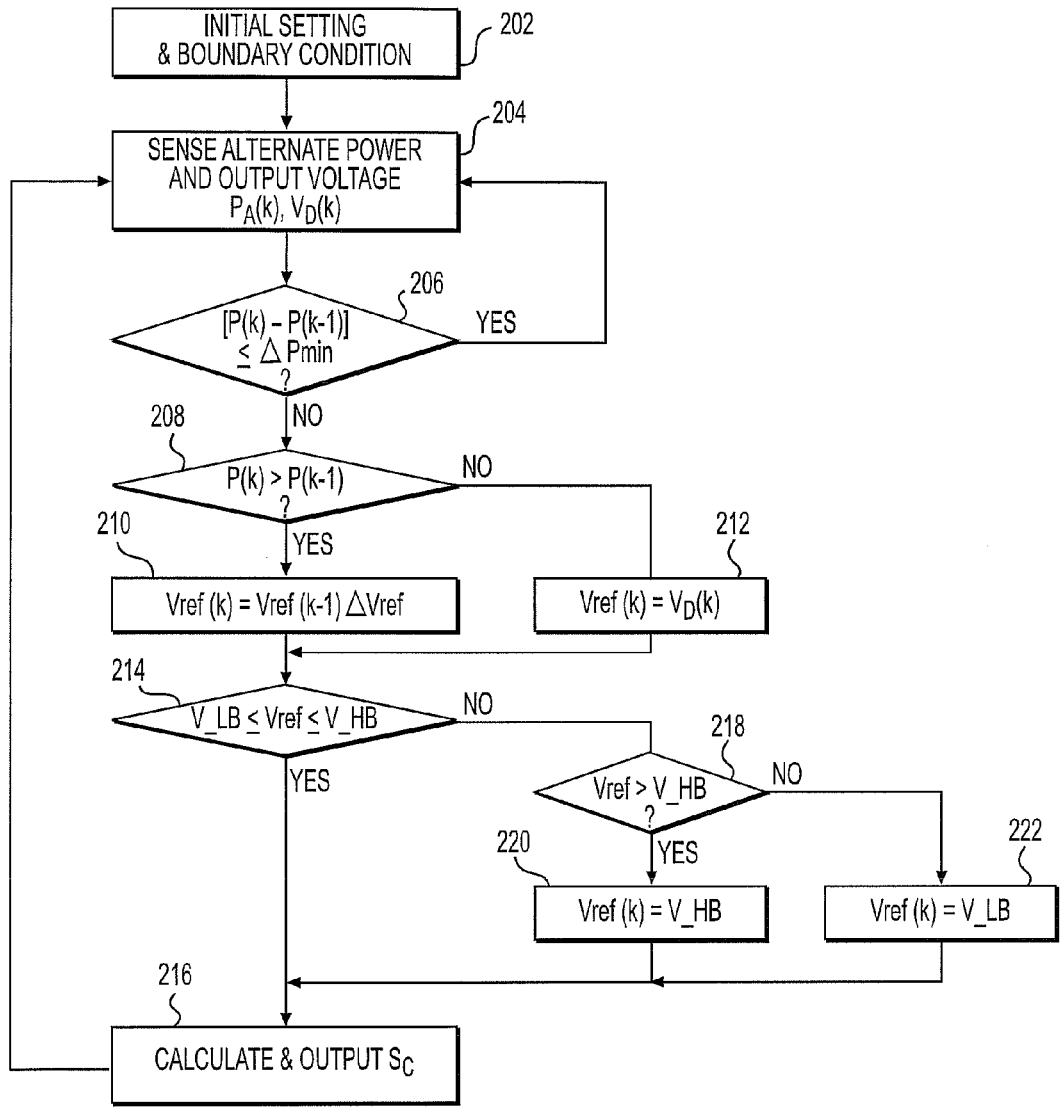
FIG. 4 is a flowchart of an algorithm for a charging system according to an example embodiment.

FIG. 4 is a flowchart of an algorithm according to an example embodiment. Other embodiments, operations and orders of operations may also be provided.

More specifically, the flowchart represents an algorithm that may be executed by a microcontroller (or controller) provided within the MPPT searching algorithm device 80 (or local to the MPPT searching algorithm device 80). The algorithm may provide the control signal $S_C$ to the power stage switching circuit 70. The algorithm may be provided on a tangible storage medium or a machine-readable medium.

The algorithm may be implemented as codes that can be read by the microcontroller (or processor) in a program-recorded medium. The machine-readable medium may include a ROM, a RAM, a CD-ROM, a magnetic tape, a floppy disk, an optical data storage device, and the like. The machine-readable medium may include implementations in the form of carrier waves or signals (e.g. transmission via the Internet).

The algorithm may help provide a maximum power delivered to the electronic device 50 while maintaining control of the alternative power supply 20. The algorithm may help provide an optimal power to the electronic device 50 while maintaining the output voltage $V_{OUT}$ (at Node D) within a desired boundary or voltage band. For example, the desired boundaries may include a low voltage boundary V_LB and a high voltage boundary V_HB. The voltage boundaries may be previously provided within the charging system 60.

In operation 202, the algorithm may perform an initial setting and boundary condition. For example, the algorithm may define the required voltage range or accepted output voltage $V_D$, the parameters for MPPT operation such as step size, sampling speed, fault condition, etc.

In operation 204, an output power $P_A$ (at Node C) of the alternative power source 20 may be sensed, and the output voltage $V_D$ (at Node D) of the power stage switching circuit 70 may be sensed. The sensed output power $P_A$ and the sensed output voltage $V_D$ may be provided to (or determined at) the MPPT searching algorithm device 80.

In operation 206, a determination may be made by comparing a previous power value P(k−1) (at Node C) to a current power value P(k) (at Node C). The determination may be whether the difference is less than or equal to a predefined threshold level $\Delta P_{min}$. In other words, the determination may be $|P(k)-P(k-1)| \le \Delta P_{min}$.

If a difference (P(k)−P(k−1)) is less than or equal to the predefined threshold level $\Delta P_{min}$ (i.e., a Yes determination), then the algorithm may return to operation 204. In the alternative, if the difference is greater than the predefined threshold value $\Delta P_{min}$ (i.e., a No determination), then the algorithm may proceed to operation 208.

In operation 208, a determination may be made regarding whether the output power P (at Node C) has increased (i.e., P(k)>P(k−1)). If the determination is that the output power has increased (i.e., a Yes determination), then the algorithm may proceed to operation 210. In operation 210, a voltage reference $V_{ref}$ may be added by a pre-defined voltage step (i.e., $V_{ref}(k)=V_{ref}(k-1)+\Delta V_{ref}$). If the determination is that the output power has decreased (i.e., a No determination), then the algorithm may proceed to operation 212. In operation 212, the voltage reference $V_{ref}$ may be reset to the current level of the output voltage $V_D$ (k) (i.e., $V_{ref}(k)=V_D(k)$).

In operation 214, a determination may be made regarding whether the voltage reference $V_{ref}$ is within an allowable voltage boundary (i.e., the low voltage boundary V_LB and the high voltage boundary V_HB) (i.e., V_LB≤$V_{ref}$≤V_HB). If there is a positive determination (i.e., a YES determination), then the algorithm may proceed to operation 216. If there is a negative determination (i.e., a NO determination), then the algorithm may proceed to operation 218.

In operation 216, the control signal $S_C$ may be calculated and output. The control signal $S_C$ may be provided to the power stage switching circuit 70.

In operation 218, a determination may be made whether the high voltage boundary V_HM is greater than the reference voltage $V_{ref}$ (i.e., $V_{ref}$>V_HB). If the high voltage boundary V_HM>$V_{ref}$ (i.e., a Yes determination), then the voltage reference $V_{ref}$ may be reset to the high voltage boundary V_HB in operation 220. If the high voltage boundary V_HB is not greater than the reference voltage $V_{ref}$ (i.e., a No determination), then the reset voltage reference may be reset to the low voltage boundary V_LB (i.e., $V_{ref}(k)$=V_LB) in operation 222.

After operation 220, the algorithm may proceed to operation 216. After operation 222, the algorithm may proceed to operation 216. In operation 216, the control signal $S_C$ may be calculated and output (such as to the power stage switching circuit 70).

After operation 216, the algorithm may proceed back to operation 204. The algorithm may repeatedly operate while the charging system 60 is in operation.

Any reference in this specification to "one embodiment," "an embodiment," "example embodiment," etc., may mean that a particular feature, structure, or characteristic described in connection with the embodiment is included in at least one embodiment. The appearances of such phrases in various places in the specification may not necessarily all be referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging system comprising:
    a switching device to receive an output voltage from a power source and to provide an output voltage from the charging system based at least in part on the output voltage received from the power source; and an algorithm device to provide a control signal to the switching device based at least in part on a sensed power from the power source and a sensed output voltage from the charging system, the control signal to be provided to the switching device to control the output voltage from the charging system, the algorithm device to compare a previous sensed power from the power source with a current sensed power from the power source, and the algorithm device to further determine if a difference between the previous sensed power and the current sensed power is greater than a threshold value, when the difference between the current sensed power and the previous sensed power is greater than the threshold value, then the algorithm device to determine if the current sensed power is greater than the previous sensed power, when the current sensed power is determined to be greater than the previous sensed power, then the algorithm device to increase a voltage reference value by a pre-defined voltage step, when the current sensed power is determined to be less than the previous sensed power, then the algorithm device to set the voltage reference value to the current sensed output voltage, the algorithm device to determine if the voltage reference is within an allowable voltage boundary, when the voltage reference is determined to be within the allowable voltage boundary, then the algorithm device to provide the control signal to the switching device, and when the voltage reference is determined not to be within the allowable voltage boundary, then the algorithm device to reset at least one of the voltage boundaries.

2. The charging system of claim 1, wherein the power source is one of a solar power source, a mechanical power source, a photovoltaic power source, a thermal power source, a radio frequency power source, a vibration power source, a biomechanical power source or a fuel cell.

3. The charging system of claim 1, wherein the switching device to adjust impedance of the output voltage from the charging system.

4. The charging system of claim 1, wherein the switching device includes at least one transistor and a driver, the driver to receive the control signal from the algorithm device, and the driver to control the at least one transistor based at least in part on the received control signal.

5. The charging system of claim 1, wherein the algorithm device includes a controller to execute an algorithm and to provide the control signal based at least in part on the executed algorithm.

6. The charging system of claim 1, wherein the charging system is provided without a voltage regulator.

7. An electronic device comprising:
a display device;
a battery charger to charge a battery based on an input voltage; and
a charging system to provide the input voltage to the battery charger, the charging system including:
a switching device to receive power from a power source and to provide an output voltage, and
an algorithm device to provide a control signal to the switching device based on a sensed power from the power source and a sensed output voltage from the switching device, the switching device to receive the control signal and to adjust the output voltage from the switching device based at least in part on the control signal, the algorithm device to determine if a difference between a previous sensed power from the power source and a current sensed power from the power source is greater than a threshold value, when the difference between the current sensed power and the previous sensed power is greater than the threshold value, then the algorithm device to determine if the current sensed power is greater than the previous sensed power, when the current sensed power is determined to be less than the previous sensed power, then the algorithm device to set a voltage reference value to the current sensed output voltage, in response to the algorithm device determining that the voltage reference is within an allowable voltage boundary, then the algorithm device to provide the control signal to the switching device.

8. The electronic device of claim 7, wherein the switching device to adjust impedance of the output voltage from the charging system.

9. The electronic device of claim 7, wherein the switching device includes at least one transistor and a driver, the driver to receive the control signal from the algorithm device, and the driver to control the transistor based at least in part on the received control signal.

10. The electronic device of claim 7, wherein the algorithm device includes a controller to execute an algorithm and to provide the control signal based at least in part on the executed algorithm.

11. The electronic device of claim 7, wherein the charging system is provided without a voltage regulator.

12. A charging method of an electronic device comprising:
receiving power from a power source;
sensing the power from the power source;
receiving the power at a switching circuit;
providing an output voltage from the switching circuit based at least in part on the sensed power from the power source;
sensing the output voltage from the switching circuit;
providing a control signal to the switching circuit based at least in part on the sensed power from the power source and the sensed output voltage from the switching circuit, wherein providing the control signal includes:
comparing a previous sensed power from the power source with a current sensed power from the power source,
determining if a difference between the previous sensed power and the current sensed power is greater than a threshold value,
if a difference between the previous sensed power and the current sensed power is determined to be greater than a threshold value, then determining if the current sensed power is greater than the previous sensed power,
when the current sensed power is determined to be greater than the previous sensed power, then increasing a voltage reference value by a pre-defined voltage step,
when the current sensed power is determined to be less than the previous sensed power, then setting the voltage reference value to the current sensed output voltage,
determining if the voltage reference is within an allowable voltage boundary, when the voltage reference is determined to be within the allowable voltage boundary, then providing the control signal to the switching device, and when the voltage reference is determined to be not within the allowable voltage boundary, then resetting at least one of the voltage boundaries; and adjusting the output voltage from the switching circuit based at least in part on the control signal.

13. The charging method of claim 12, wherein providing the output voltage includes adjusting impedance of the power received from the power source.

14. The charging method of claim 12, wherein providing the control signal includes executing an algorithm and using the sensed power from the power source and the sensed output voltage from the switching circuit to provide the control signal.

15. The charging method of claim 12, further comprising providing the adjusted output voltage to a load of the electronic device.

16. The charging method of claim 12, wherein the switching circuit is provided without a voltage regulator.

\* \* \* \* \*